United States Patent [19]
Jensen, Jr.

[11] Patent Number: 4,728,552
[45] Date of Patent: Mar. 1, 1988

[54] SUBSTRATE CONTAINING FIBERS OF PREDETERMINED ORIENTATION AND PROCESS OF MAKING THE SAME

[75] Inventor: Elmer W. Jensen, Jr., Norwalk, Conn.

[73] Assignee: Rodel, Inc., Newark, Del.

[21] Appl. No.: 628,354

[22] Filed: Jul. 6, 1984

[51] Int. Cl.$^4$ .................. B24D 3/26; B24D 11/00; B32B 5/08; B32B 5/18
[52] U.S. Cl. .................. 428/91; 15/230.12; 51/395; 51/401; 51/328; 51/298; 101/376; 101/379; 156/264; 156/266; 188/251 A; 188/259; 384/297; 427/245; 427/373; 428/95; 428/96; 428/97; 428/109; 428/113; 428/119; 428/317.9; 428/423.1; 428/423.7
[58] Field of Search .............. 156/264, 266; 427/245, 427/373; 428/91, 95, 96, 97, 109, 113, 119, 317.9, 423.1, 423.7

[56] References Cited

U.S. PATENT DOCUMENTS

| | | |
|---|---|---|
| 3,000,757 | 9/1961 | Johnston et al. . |
| 3,067,483 | 12/1962 | Hollowell . |
| 3,100,721 | 8/1963 | Holden . |
| 3,180,853 | 4/1965 | Peters, Jr. . |
| 3,208,875 | 9/1965 | Holden . |
| 3,284,274 | 11/1966 | Hulslander et al. . |
| 3,449,870 | 6/1969 | Jensen . |
| 3,499,250 | 3/1970 | Jensen et al. . |
| 3,504,457 | 4/1970 | Jacobsen et al. . |
| 3,536,553 | 10/1970 | Farrell et al. . |
| 3,581,439 | 6/1971 | Jensen et al. . |
| 4,347,280 | 8/1982 | Lau et al. . |
| 4,519,804 | 5/1985 | Kato et al. ............. 428/91 |

Primary Examiner—James C. Connon
Attorney, Agent, or Firm—Panitch, Schwarze, Jacobs and Nadel

[57] ABSTRACT

The present invention relates to a poromeric article of manufacture comprising a felt sheet of fibers impregnated with microporous elastomer having a work surface, side surfaces joining the work surface and a support surface joining the side surfaces, wherein a majority of the fibers are oriented primarily transverse to the work surface such that the majority of fiber ends adjacent to the work surface form an angle of between about 45° and about 135° with respect to the work surface, and preferably, wherein the fibers have a unidirectional orientation substantially perpendicular to the work surface. The present invention also includes a plurality of such articles bonded together and oriented such that the work surfaces of adjacent articles are substantially coplanar to form a laminated article of manufacture. Further, processes for making the basic and laminated articles are set forth as other aspects of the invention.

25 Claims, 21 Drawing Figures

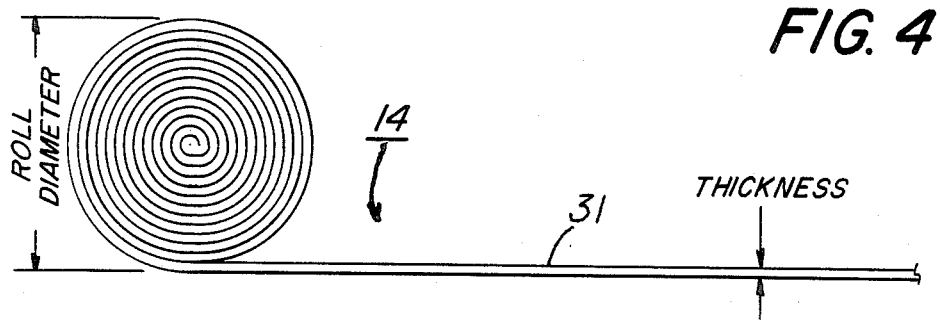
FIG. 4
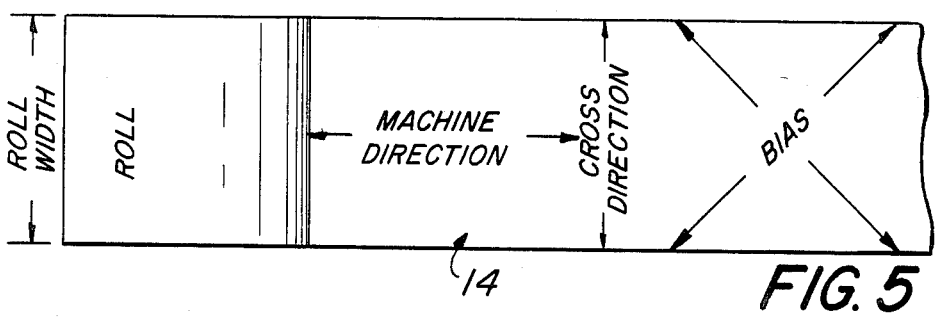
FIG. 5
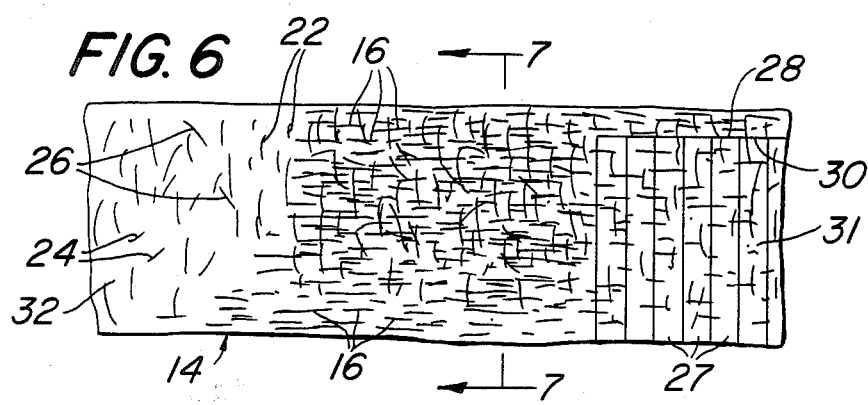
FIG. 6
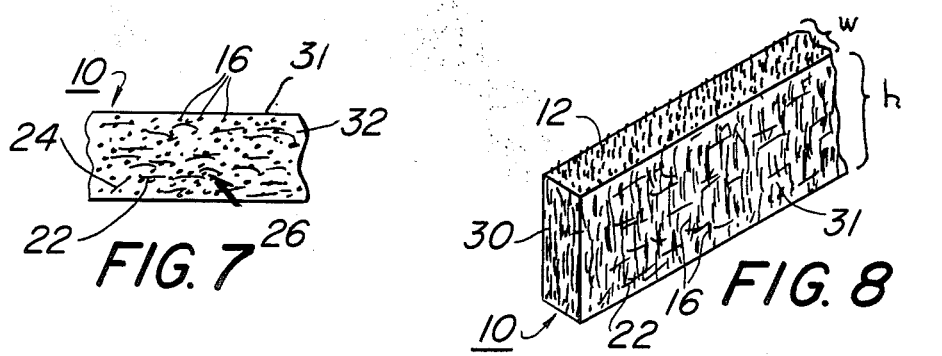
FIG. 7
FIG. 8

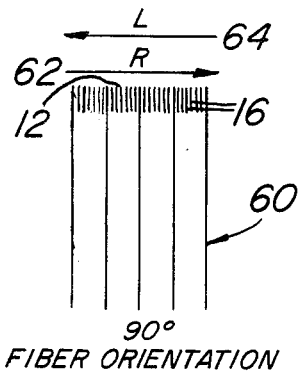
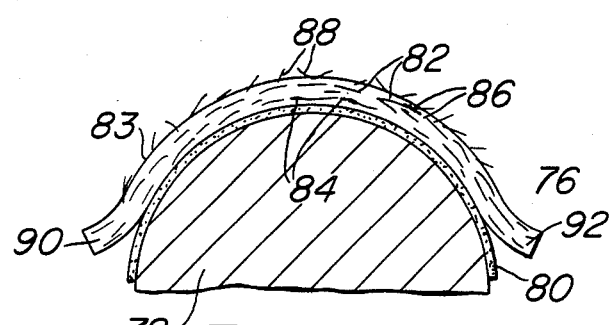
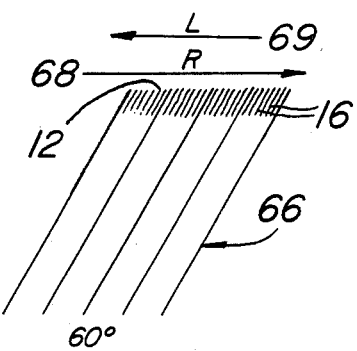
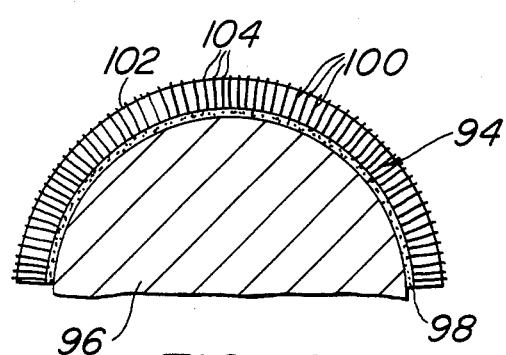
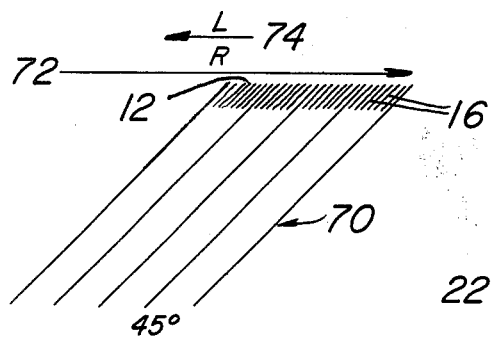
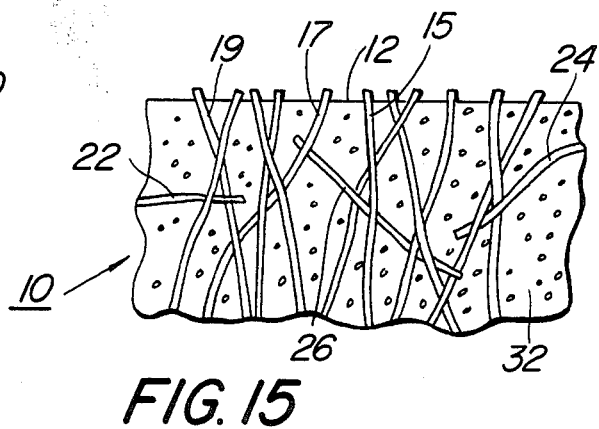

SUBSTRATE CONTAINING FIBERS OF PREDETERMINED ORIENTATION AND PROCESS OF MAKING THE SAME

BACKGROUND OF THE INVENTION

1. Field of the Invention

The present invention relates to an article of manufacture which is extremely valuable as a substrate for use in polishing materials, and especially for polishing semiconductor wafers. As set forth below, many other uses could be made of the novel article of manufacture according to the present invention.

More specifically, the present invention relates to a poromeric material comprising a piece or sheet of fibrous felt impregnated with a microporous elastomer wherein a majority of the fibers forming the felt are oriented primarily transverse to the surface of the article being used as a work surface, such as a polishing surface, bearing surface, etc., whereby the majority of fiber ends adjacent to the work surface, and preferably, the longitudinal axes of the fibers, form an angle of between about 45° and 135° with respect to the work surface. The present invention also relates to a process for making the novel article of manufacture.

2. Description of the Prior Art

Conventional substrates used for polishing and other operations for which the article of the present invention may be used include a non-woven piece or web of felt made from fibers such as polyester fibers, which is impregnated with a microporous elastomer, such as urethane, to produce a breathable, water-repellent structure. A typical example of a prior art structure is COR-FAM poromeric material made by the E.I. du Pont de Nemours and Company (du Pont) and ULTRA-SUEDE poromeric fabrics of Kuraray Co., Ltd. These products are often used to make shoes, fabrics for clothing and upholstery, and have been used as substrates for polishing, as well.

In the prior art, the fibers of the impregnated felt are randomly oriented but generally are predominantly parallel to the major plane of the felt web. The web is ligated by forceably orienting sufficient fibers to a position substantially perpendicular to the plane of the web and/or interwoven so that a unitary, dense adherent structure is formed. During felting, some of the fibers are pushed into the perpendicular orientation, but subsequent calendering flattens most of the perpendicular fibers, and leaves them interwoven with the predominantly parallel fibers. Ligation typically is accomplished by punching the web with fine, barbed needles mounted in a conventional needle loom.

The following du Pont U.S. patents disclose various poromeric materials in which the fibers of the felt are randomly oriented generally parallel to the major plane of the felt sheet as described above and various methods of making them: U.S. Pat Nos. 3,000,757, issued Sept. 19, 1961; 3,067,483, issued Dec. 11, 1962; 3,100,721, issued Aug. 13, 1963; 3,180,853, issued Apr. 27, 1965; 3,208,875, issued Sept. 28, 1965; 3,284,274, issued Nov. 8, 1966; and 3,536,553, issued Oct. 27, 1970. These patents disclose examples of various synthetic fibers and elastomers which can be used to make the poromeric material, as well as various processing steps involved in making the poromeric material. The state of the art for making poromeric materials having the above-described prior art random fiber orientation is well developed and those of ordinary skill in the art would know of various substitutions that can be made in the prior art to make products having various characteristics.

The following U.S. patents in which I have been named a sole or joint inventor disclose the use of prior art poromeric materials for various polishing functions: U.S. Pat. Nos. 3,449,870, issued June 17, 1969; 3,499,250, issued Mar. 10, 1970; 3,504,457, issued Apr. 7, 1970; and 3,581,439, issued June 1, 1971.

It is known that poromeric material can be subjected to various surface treatments, such as buffing, napping or the like to alter the surface characteristics of the poromeric material. See, for example, du Pont U.S. Pat. No. 3,067,483 at column 2, lines 37–39, and U.S. Pat. No. 4,347,280, issued Aug. 31, 1982, disclosing an invention of which I was a co-inventor.

In conventional poromeric polishing pads, the fibers holding the pad together and supporting the soft elastomeric component contribute little to the polishing process. To the contrary, with pads containing fibers having a flat orientation at the polishing surface, the fibers actually impede and block the polishing process by trapping spent polishing slurry, small particles of the polished article which are removed in the polishing process, etc. Moreover, the fibers having a flat orientation at the pad surface shield from the workpiece a large proportion of the microporous elastomer which is the active polishing component. The sides of the fibers do not polish effectively.

Prior art polishing pads have to be replaced when the fibers at the surface of the pads trap foreign particles which actually may scratch the surface of the articles being polished. Where the articles are semiconductor wafers, even slight scratching renders them totally useless. Often, prior art poromeric polishing pads have to be replaced when less than 10% of the thickness of the pad has been used. This results in a significant waste and high cost of use. Moreover, a conventional pad cannot have its surface reconditioned and must be discarded when its surface becomes loaded or worn.

It is desirable to have as much of the porous elastomer available at the surface of the polishing pad as possible, since the elastomer is primarily responsible for the polishing action. However, if the reinforcing fiber content is reduced to expose more elastomer, the structural integrity of the pad and the elastomer is weakened to the point where it becomes so soft that it does not polish well. While the prior art reinforcing felt web with the random fiber orientation generally parallel to the plane of the web provides the poromeric elastomer with the required support to be useful, it does so at the expense of the desirable characteristics of the elastomer of softness, suppleness, flexibility and absorbency which are important for poromeric material, particularly when it is used in a polishing operation.

A feature of using poromeric materials for polishing is that the surface of the poromeric elastomer has a type of "pumping action" in which each small pore at or near the pad surface may be considered a miniature pump. The pressure of the workpiece passing over a pore compresses it, expelling spent polishing slurry and dross as the pad spins. The pore then expands and fills with fresh polishing slurry. With prior art polishing pads, the pumping action adjacent the surface of the pad deteriorates as the generally parallel fibers become loaded. Prior art pads become stiff and develop inflexible areas caused by dense or attenuated horizontal fiber bundles.

Thus, the flexibility of prior art polishing pads is reduced, inhibiting the advantageous pumping action.

Polishing pads made of poromeric materials according to the prior art cannot be oriented to have polishing directionality, since the fibers are generally evenly oriented in the plane of the web. As conventional pads wear, they expose layer after layer of unlike structure, resulting in non-uniform polishing rates and characteristics which may adversely affect the polishing operation. Moreover, conventional polishing pads require a break-in period to reach their optimum polishing performance because certain surface effects resulting from the manufacture of the pads, such as surface coagulation and alteration during drying, buffing, splitting, and the like, act as barriers to the active pad. Additionally, as conventional pads wear, both fiber bundles and pieces of elastomer are subject to being pulled out in masses. This leaves gaping holes in the surface of the pad in which dross and chips collect, causing accelerated and uneven wear of the pad and ineffective polishing and often harmful scratching of a workpiece.

The present invention overcomes the undesirable aspects and disadvantages associated with prior art poromeric material. The poromeric material of the present invention represents a significant improvement over prior art poromeric material, particularly where it is used as a polishing substrate.

SUMMARY OF THE INVENTION

One aspect of the present invention relates to a poromeric article of manufacture comprising a felt sheet of fibers impregnated with microporous elastomer having a work surface, side surfaces joining the work surface and a support surface joining the side surfaces, wherein a majority of the fibers are oriented primarily transverse to the work surface such that the majority of fiber ends adjacent to the work surface form an angle of between about 45° and about 135° with respect to the work surface.

Another aspect of the present invention relates to a process of making an article of manufacture comprising the steps:

(a) making a preform by
 (i) forming a felt sheet made of fibers in which the majority of fibers are arranged to provide a predetermined orientation,
 (ii) impregnating the felt sheet with a microporous elastomer, and
 (iii) curing the elastomeric impregnated felt sheet; and
(b) cutting the preform in such a manner that the majority of fibers are oriented primarily transverse to the cut surface, the cut surface forming a work surface whereby the predetermined orientation is such that the majority of fiber ends adjacent to the work surface form angles of between about 45° and about 135° with respect to the work surface.

DEFINITIONS

"Adjacent" as used herein, such as where fiber ends are adjacent to the work surface, means that the fiber ends are at and slightly above and below the work surface.

"Percent" or "%" as used herein refers to weight percent of the component or composition being explained.

"Primarily transverse" as used herein means forming an angle of about 45° to about 135° with respect to a predetermined surface.

"Uni-directional" as used herein with respect to fiber orientation means that the longitudinal axes of fibers are substantially as parallel as possible using available fiber alignment equipment.

"Work surface" as used herein means the surface of the article of the present invention which acts as the surface which contacts a workpiece, such as the polishing surface, the load bearing surface, or the like.

ADVANTAGES OF THE PRESENT INVENTION

By orienting most of the fibers of the impregnated felt in a direction primarily transverse to the work surface, and most desirably for most operations, in a unidirectional orientation perpendicular or normal to the work surface, a great many advantages are achieved compared to prior art poromeric materials, especially when they are used as polishing pads themselves or as substrates for polishing slurries, etc. in a polishing operation.

The poromeric material of the present invention has great structural integrity and is also soft, supple, flexible and absorbent. The structure of a polishing pad according to the present invention is substantially uniform and homogeneous throughout the thickness of the pad primarily transverse to the work surface. Rather than impeding or otherwise adversely affecting the polishing process when pads according to the present invention are used as polishing pads or substrates for a polishing operation, the primarily transverse and preferably unidirectional fibers present to the work or polishing surface more of the microporous elastomer as the primary polishing material than heretofore available.

The ends of the primarily transverse and preferably uni-directional reinforcing fibers in poromeric material of the present invention adjacent to or slightly extending from the work surface become active polishing components, rather than a mere reinforcing structure which tends to adversely affect polishing. Since the ends, rather than the sides, of such fibers are exposed at the work surface, there is little or no tendency for the fibers to trap spent slurry particles or other dross. Moreover, as the ends or tips of such fibers wear, they do so evenly and do not become clogged in the fibrous felt because they are small and are readily expelled from the pad as the pad contacts the edges of the workpiece or as the pad spins. As a result, a fresh polishing surface of elastomer is exposed substantially continuously.

Where a laminated article of manufacture is formed by bonding together a series of pads such that their work surfaces are substantially coplanar, the bonding adhesive layers, like the uni-directional fibers, are also primarily transverse and preferably substantially perpendicular to the work surface. In this way, the bonding agent, preferably made of the same elastomer used to impregnate the felt layer, also performs a beneficial polishing function and acts as wiper of the surface being polished, much as a windshield wiper.

A polishing pad made according to the present invention having the same thickness as a conventional poromeric polishing pad will polish about 2½ times faster and last at least 12 times longer than conventional poromeric polishing pads. Unlike a conventional pad which must be discarded after a very small amount of wear due to surface blocking or pad deterioration, a pad made according to the present invention presents a substantially identical work surface as the pad wears. Thus, polishing characteristics are not dependent upon the nature of a very thin surface layer as in conventional pads. If necessary, a pad according to the present invention can be reconditioned repeatedly, exposing a new work surface, such as by grinding off as little as 0.005 inch (0.13 mm).

The pore alignment discussed hereinafter produces a more efficient pumping action that adds to the effectiveness of clearing and cleaning the pores of the elastomer. The pumping action of the pad of the present invention is much more effective as compared with conventional pads. There are no stiff or soft spots caused by dense or attenuated fiber bundles parallel to the work surface. The flexibility of the pad is maintained uniform over the entire surface. In essence, it has 100% memory. This aids the pumping action.

Because insulating layers and bundles of fibers parallel to the work surface are not present in pads of the present invention, heat transfer through the pads, such as when the pads are attached to a cooling plate, is smooth and even. The heat transfer can be calibrated and controlled much more easily because of the orientation of the preferably uni-directional fibers primarily transverse to the work surface and due to the generally aligned pore formation in the elastomer. As a result, the pads quickly reach an equilibrium temperature suitable for most polishing applications.

The orientation of the uni-directional fibers can be designed to have various transverse angles so that the nature and extent of the scrubbing or polishing action may be varied.

Due to the primarily transverse orientation of the fibers, the adhesive attachment of the article of the present invention to a support structure, such as a platen or roller, is enhanced. The pad maintains a uniform thickness having uniform characteristics even when attached to a curved support, such as a polishing roller.

The present invention presents a very smooth and truly functional work surface immediately and requires no break-in period. The invention's surface features and texture allows the pad to wet out immediately, assures an even spread of slurry over the entire working surface, and holds the slurry in place, preventing it from readily spinning off a polishing wheel. This results in the use of less slurry and improved polishing, as well as allowing the use of lighter pressure for more delicate polishing tasks.

By bonding together several strips as discussed above to make a laminated pad in which the work surfaces are substantially coplanar, any deviation in the fiber, felt, elastomer, pore distribution or other components of individual layers are nullified. The use of a plurality of laminated layers produces an averaging effect resulting in an extremely uniform work surface.

Where a pad having a flat surface is desired, a pad made according to the present invention will remain flat and true longer than conventional pads. This is due not only to the ability to use lighter pressures for the same amount of polishing compared to prior art pads, but also because the primarily transverse and especially the uni-directional fibers will not be pulled out of the pad as the sharp edges of the workpiece pass over them. The primarily transverse fibers retard uneven surface wear. Work pieces glide smoothly across the surface of pads made according to the present invention. Since the present invention produces pads having a smoother surface, even though less pressure is required in many applications, higher pressures can be used on large, thin, delicate workpieces where required without adverse consequences.

The purpose of this section is to highlight many of the major advantages of the present invention compared to the prior art. The present invention may have other advantages not specifically set forth in this section as will be apparent to those skilled in the art after reviewing the following specification in conjunction with the drawings.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 4 is a side elevational view of a rolled felt web used to make the substrate for the present invention.

FIG. 5 is a plan view of the rolled felt web illustrated in FIG. 4.

FIG. 6 is an enlarged plan view of a portion of the felt web of FIGS. 4 and 5 after impregnation with porous elastomer, illustrating diagrammatically the direction of the felt fibers and the cutting of the impregnated felt web.

FIG. 7 is a transverse cross-sectional view of the impregnated web taken along lines 7—7 of FIG. 6.

FIG. 8 is a perspective view of one of the strips cut from the web of FIG. 6.

FIG. 10 is a diagrammatic cross-sectional view of a laminated article according to the present invention in which the majority of uni-directional fibers are disposed substantially perpendicular to the work surface of the article and in which the arrows indicate substantially equal polishing action in both directions.

FIG. 11 is a diagrammatic cross-sectional view of a laminated article according to the present invention in which the majority of uni-directional fibers are disposed at an approximate angle of 60° with respect to the work surface of the article and in which the arrows indicate a greater polishing and cleaning or wiping action if the article is moved toward the right than if the article is moved to the left with respect to the product being polished.

FIG. 12 is a diagrammatic cross-sectional view of a laminated article according to the present invention in which the majority of uni-directional fibers are disposed at an angle of approximately 45° with respect to the work surface of the article and in which the arrows indicate that there is a much greater polishing and cleaning or wiping action if the article is moved toward the right than if the article is moved toward the left with respect to the product being polished.

FIG. 13 illustrates the application of a prior art polishing pad to a roller highlighting certain problems associated with the prior art.

FIG. 14 illustrates the application of a laminated polishing pad according to the present invention to a roller and highlights the improvements compared to the prior art illustrated in FIG. 13.

FIG. 15 illustrates a portion of the most general form of an article of manufacture according to the present invention in which the majority of fibers ar primarily transverse to the work surface of the article, but where the primarily transverse fibers need not have a unidirectional orientation.

DETAILED DESCRIPTION OF THE PREFERRED EMBODIMENTS

Figure 1:
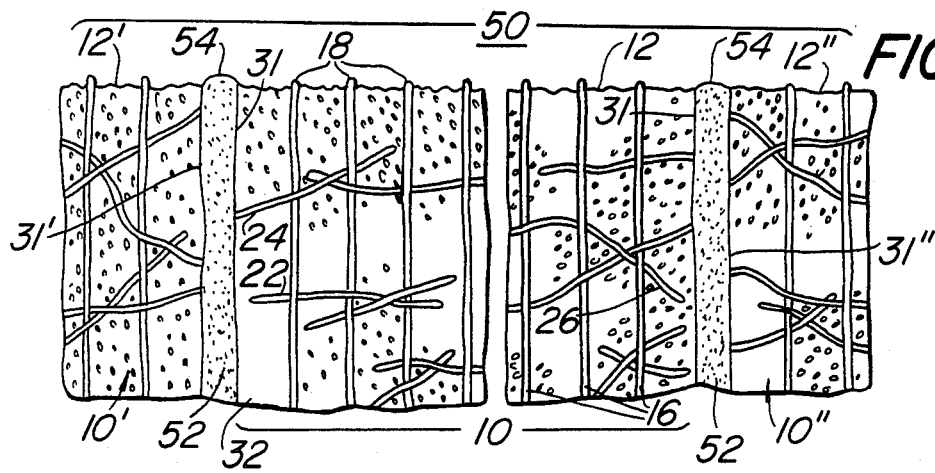
FIG. 1 is an enlarged cross-sectional view of a laminated article of manufacture according to the present invention, the center, ends and bottom portions being broken away.
Figure 2:
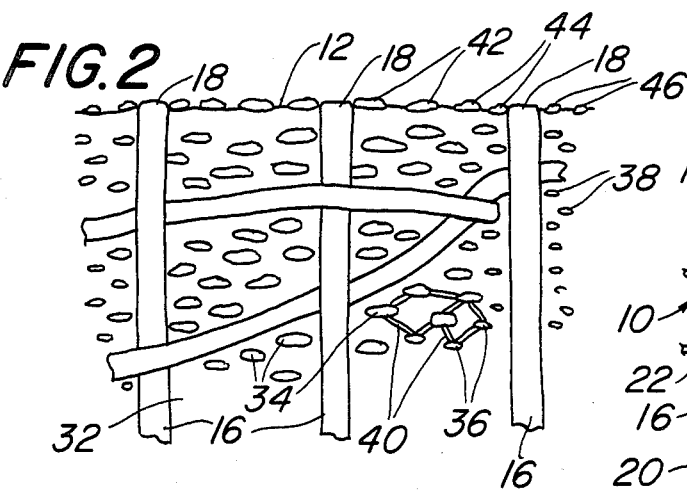
FIG. 2 is a more greatly enlarged cross-sectional view of a portion of an individual, nonlaminated article of the present invention further illustrating slurry particles on the work surface of the article.

Referring to the drawings in detail, wherein like numerals indicate like elements, there is shown in FIGS. 1, 2, 8 and 15 an article of manufacture 10 made according to the present invention. FIG. 1 illustrates article 10 bonded to flanking like articles 10' and 10" by an adhesive bonding agent 52. FIG. 2 illustrates article 1 in enlarged detail. FIG. 8 illustrates article 10 in a perspective view. FIG. 15 illustrates the most general arrangement of article 10 wherein the primarily transverse fibers need not be in a uni-directional orientation.

The poromeric article of manufacture of the present invention is extremely well suited for use as a polishing pad either by itself or as a substrate in a polishing operation in which a polishing slurry is used to provide a desired surface finish for semiconductor wafers, silicon wafers, crystals, glass, ceramics, polymeric plastic material, metal, stone, and other surfaces. Polishing pads made with the article of the present invention may be used with lubricants, coolants and various abrasive slurries, all well known to those skilled in the art and readily available commercially. Although the poromeric materials of the present invention are extremely effective in polishing operations, and this disclosure generally will relate to their use in polishing operations, the articles of the present invention have many other diverse uses, including, for example, bearings or bearing surfaces; seals and gaskets; stropping discs, buffing wheels; wringers; scrubbers; brake and grip pads; printing rollers and printing roller covers, hickey pickers; impact curtains; footwear and other clothing items, especially waterproof, breathable items, as well as many other applications. Accordingly, although this disclosure is directed toward the use of the present invention in polishing applications, such disclosure is for purposes of illustration only and the invention should not be construed to be limited only to such uses.

The work surface of article 10 is indicated in the drawings, particularly FIGS. 1, 2, 8 and 15, by numeral 12. Articles 10' and 10" include work surfaces 12' and 12", respectively (see FIG. 1). Although work surface 12 is illustrated as being in a horizontal direction and as the upper surface of article 10 for purposes of illustration, it will be clear to those skilled in the art that the article can be oriented in any direction, such that work surface 12 can form either the top, bottom, left side, right side, inside or outside of any particular product of which it forms a part.

The poromeric article 10 includes two essential components: a fibrous felt web or mat 14 (best illustrated in FIGS. 4, 5 and 6) in which the majority of fibers making up the felt are oriented in a specific direction as set forth below; and a porous elastomer 32 which impregnates felt web or mat 14. Unlike typical non-woven felt as used in poromeric materials of the prior art, in which the fibers are randomly oriented but should be mostly equally distributed in planes parallel to the work surface of the poromeric article, the fibers of the felt web used as the impregnated substrate for the present invention have a much more specific orientation. The majority of fibers, and preferably the vast majority, on the order of about 60% to about 85%, are oriented primarily transverse to the direction which will form work surface 12. Preferably, the fibers are in a uni-directional orientation primarily transverse to work surface 12 and, preferably, perpendicular to work surface 12 when the article is used as a polishing pad or substrate for most polishing operations.

The most general configuration of the article of manufacture of the present invention is illustrated in FIG. 15. FIG. 15 is a greatly enlarged view of only a portion of article 10 showing the general orientation of fibers impregnated with a porous elastomer 32. In accordance with the present invention, a majority of fibers 15, 17 and 19 are oriented primarily transverse to work surface 12 such that the ends of the fibers adjacent to the work surface, and generally, the longitudinal axes of the fibers, form angles of between about 45° (represented by angled fiber 17) to about 135° (represented by angled fiber 19) with respect to the work surface. Fibers 22, 24 and 26 represent the orientation of other fibers in the impregnated web used to make article 10 which are necessary to hold the web together. Fiber 15 is representative of the many fibers which are oriented substantially perpendicular to work surface 12.

Figure 3:
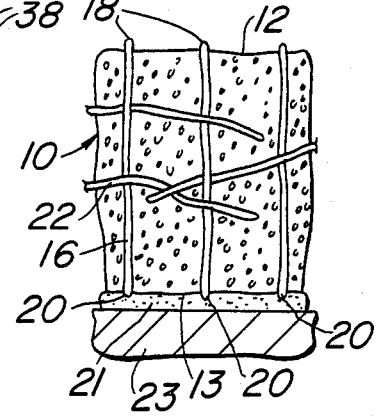
FIG. 3 is a cross-sectional view of an article of the present invention, still on an enlarged scale, but on a smaller scale than FIGS. 1 and 2, showing the attachment of the article to a support member.

The presently most preferred embodiment of the present invention is best illustrated in FIGS. 1, 2, 3 and 8, wherein article 10 containing the felt web includes a majority of fibers 16 substantially uni-directionally oriented transverse to work surface 12. Although each uni-directional fiber 16 is illustrated in FIG. 3 as extending entirely through the article from work surface 12 to opposite surface 13, this is only a diagrammatic representation and may apply only for poromeric materials having a short distance between surfaces 12 and 13. For thick webs, there can be several uni-directional fibers 16 in axial or offset alignment primarily transverse to work surface 12. This is best illustrated in FIG. 8. The same basic explanation applies to the embodiment of FIG. 15. Uni-directional fibers 16 have ends or tips 18 coextensive with or extending slightly from work surface 12, as well as tips 20 preferably slightly extending from the surface 13 opposite the work surface, as best illustrated in FIG. 3.

In addition to containing substantially uni-directional fibers 16, the fibrous felt web contains sufficient randomly oriented fibers to provide the web with structural integrity as a support means for the impregnated elastomer. The randomly oriented fibers are represented by fibers 22 (FIGS. 1, 6, 7, 8 and 15) which are generally parallel to the work surface, and fibers 24 and 26 at generally oppositely biased angles throughout the width and thickness of the felt web.

For most applications, it is preferred that fibers 16 be uni-directional and oriented perpendicular or normal to work surface 12 of article 10. However, for certain specialized applications, uni-directional fibers 16 may be oriented at other angles primarily transverse to work surface 12, as best illustrated in FIGS. 10, 11 and 12.

Various types of natural and synthetic fibers can be used to make the non-woven web for the poromeric material of the present invention. The selection of the fibers may be based upon their physical and/or chemical characteristics and matched to the design and use of the poromeric product of which they are a part. Some physical characteristics of fibers to consider are denier, thickness, length, cross-sectional shape, strength, abrasion resistance, friability, color, surface texture, etc. Various chemical properties to consider include the crystallinity, orientation, degree of draw, molecular weight distribution, linearity, and other molecular attributes. Moreover, fillers, brighteners, coloring agents and pigments, extenders and the like can be coextruded with or coated on the fiber.

The fiber to be used in the present invention should be strong and have tensile properties which allow it to be needled or otherwise formed into a felt web. The fiber should be friable enough to break cleanly and thereby prevent pilling. The fiber should be free of contaminants which can scratch finely polished surfaces. The fiber should be compatible with small amounts of fine abrasives, such as titanium dioxide, which also acts as a pigment (a whitening agent), that may also be incorporated into the fiber structure. The linear or side surface of the fiber must be such that it bonds well to the elastomer component and must be free of fiber finishes and release agents.

Several natural fibers which may be useful for certain operations are wool, flax, silk and cellulosic fibers, such as cotton. Synthetic fibers are generally preferred over the natural fibers because it is easier to control their composition and generally it is easier to clean and form the synthetic fibers into webs having the desired fiber orientation.

The presently preferred fiber is a polyester fiber, such as polyethyelene terephthalate (du Pont's DACRON, for example). This fiber has tensile properties which permit it to be extruded from a spinneret in which it has a random orientation and yet is handled very well in a drawing process so as to have a high degree of linear crystallinity. The formation process is well known to those skilled in the art and need not be explained in detail.

In addition to polyester fibers, many other synthetic fibers can be used, depending on the desired properties of the product and its end use. Suitable synthetic fibers include polytetrafluroethylene, polypropylene, polyamides, for example the various nylons, aramids, etc.

The construction of a fibrous felt in accordance with the present invention will now be described with particular reference to FIGS. 4 through 7 in which FIGS. 6 and 7 illustrate the felt after it is impregnated with an appropriate elastomer.

With reference to FIGS. 4, 5 and 6, the individual fibers are oriented so that a majority, and preferably a vast majority (fibers 16), have a uni-directional orientation, preferably in the machine direction as indicated in FIG. 5. While a uni-directional fiber orientation is preferred, the present invention can be effective with a minor amount of random fiber orientation, so long as the majority of the fibers have a transverse orientation with respect to a surface which will ultimately become the work surface of the poromeric article of the present invention. The present invention uses a felt web unlike prior art felt webs in which fibers are equally oriented in all planar directions; namely, in the machine direction, cross direction and bias directions of FIG. 5, with as much random intermingling as possible throughout the thickness of the web in the direction normal to the surface. In the present invention, sufficient fibers are oriented at random, both in the cross direction (fibers 22) and in the bias directions (fibers 24 and 26), both parallel to and at oblique angles to upper surface 31 of web 14 throughout the thickness of the web to give the felt the structural integrity required for processing.

Fibers typically are sold in bales in which the individual fibers are in a series of packed bundles. The fiber bundles in the bale are subject to an opening process in which the compressed bundles of staple fibers contained in the bale are separated into loose tufts and heavier impurities are removed. Machines called openers are well known to those skilled in the art. From the opening process, the staple fibers are fed to a picker machine that opens staple fiber and forms them into a continuous fiber sheet or batting. The batting is then subjected to the carding process in which the staple fibers of the batting are opened, cleaned and, most importantly for the present operation, aligned. The alignment process continues, by feeding the batting through other pickers or other alignment machines known to those in the textile processing industry. At this point, the batting or web has a majority of fibers 16 oriented in the same general direction, which will ultimately, after further processing, be primarily transverse to and preferably in a uni-directional orientation with respect to the work surface. From there, the web is fed into a needle loom in which barbed needles spaces in an unaligned arrangement bond together the fibers in the non-woven felt web.

For ease of processing, most felters prefer to use fiber blends in which fibers having at least two different denier are preferred. The denier generally ranges from about 1.5 to about 3.0 for the preferred polyester fibers, but some blends may be used with polyester fibers of deniers less than 1.0 to about 6.0 denier. Suitable polyester fibers can be obtained from American Enka Company, Celanese Corp., du Pont, Hercules, Inc. and Hoechst Fibers, Inc., among others. The presently preferred web is made of the following individual staple fibers in the indicated proportions: 30% du Pont Type 54, 1.5 denier and 1.5 inches (38.1 mm) long; 30% Celanese Type 410, 1.5 denier and 2 inches (50.8 mm) long; and 40% du Pont Type 790, 3 denier and 3 inches (76.2 mm) long.

The primarily transverse fibers 16 generally are more resistant to wear than the elastomer. As a result, such fibers protect the work surface of the poromeric elastomer giving it a longer polishing life. Nevertheless, it is important that the fiber's resistance to wear not be so great that it blocks the porous structure and prevents the elastomer from wearing. The fibers must allow for the exposure of new, fresh pores so that the work surface will not harden, capture spent slurry or other dross caused by the differential wear of both the workpiece being polished and the polishing pad work surface, which necessarily occurs in any polishing operation. Unless fresh pores are exposed, polishing will be impeded and scratching of the workpiece may occur. The fibers must be sufficiently friable or abradable so that they break or wear off at a controlled rate sufficient to expose fresh polishing surfaces of elastomer, which is the primary polishing medium.

During polishing, as fiber ends 18 contact the workpiece, they become dull but break off cleanly, exposing fresh, new ends. Likewise, aligned lenticular or isotropic abrasive components or fillers contained in the fibers will also affect the friability of the fiber. The fiber and fillers should be selected to be such that, as the fiber tip wears, it will snap off to expose fresh abrasive or filler particles. Up to about 3% of $TiO_2$ is the preferred filler, and as presently preferred, it may be present in an amount of about 1% to about 3%, and specifically, about 2%.

The physical and chemical properties of the felt are controlled not only by the characteristics of the fibers, but also by the density of the fibers. The factors must be balanced to leave a sufficient void volume among the fibers to allow space for the microporous elastomer to impregnate. If there are too few fibers, the porous elastomer will not have adequate support. If there are too many fibers, impregnation will be difficult or incomplete.

The density of the fibers in the felt can be varied depending upon the ultimate use of the article of manufacture of the present invention. Where the article is intended as a polishing pad substrate, the felt may have a density of about 0.20 g/cc to about 0.30 g/cc. More particularly, the presently preferred density is from about 0.255 to about 0.270 g/cc, with the optimum density being about 0.260 g/cc.

Conveniently, the fibrous felt webs are formed into rolls in which the fibers have the orientation illustrated in FIG. 6. The felt is then impregnated with a solution or colloidal dispersion including the desired elastomer, such as a polyurethane, (hereinafter referred to as "urethane") 32, as best illustrated in FIGS. 1, 2, 6 and 7. Different elastomers may be used in the present invention so long as the elastomer selected has a sufficient porosity, density, hardness, resistance to abrasion, chemical stability and other characteristics acceptable for the designed use of the product. Preferred elastomers are urethanes, and specifically urethanes of a type disclosed in du Pont's U.S. Pat. Nos. 3,180,853 and 3,284,274, the disclosures of which are hereby incorporated herein by reference.

In general, a suitable urethane can be used in the present invention in which the urethane is a linear polymer having a molecular weight of about 5,000 to about 300,000, and preferably about 150,000 to about 160,000, formed by reacting an organic diisocyanate with an active hydrogen containing polymeric material such as a polyalkyleneether glycol or hydroxyl-terminated polyester to produce an isocyanate-terminated polyurethane prepolymer, and reacting the resulting prepolymer with a chain extender which may be a compound having the formula

in which R is a saturated aliphatic group having one to four carbon atoms.

A urethane according to the present invention should have a viscosity of about 2,000 cps to about 18,000 cps, with a preferred viscosity of about 9,500 cps, all measured at 40° C. The urethane is dissolved in N, N-dimethyl formamide (DMF). The solids content of the solution should be from about 5% to about 20%, preferably from about 10% to about 15%, and as presently most preferred, about 12%. The elastomer is cured by any of several techniques well known to those skilled in the art. See, for example, the curing techniques disclosed in the above-identified du Pont patents. In general, the elastomer is cured by a process including the steps of coagulation, leaching and drying.

Furthermore, no novelty is claimed in connection with the preparation of the elastomer or the impregnation of the web with the elastomer. Rather, the present invention resides in the particular orientation of fibers in the impregnated felt web to produce the article according to the present invention.

The felt web is then saturated with a solution of urethane or the urethane-PVC blend in DMF. Saturation may be done by directing a continuous felt web into a vessel containing the solution maintained at a temperature of about 49° C. for about three minutes. The presently preferred method of saturating the felt web with the solution is to allow the felt web to float on the top of the solution contained in an elongated vessel so that the solution is wicked into the felt. The solution should be maintained at a temperature of about 49° C. and the felt web should be in contact with the solution for about five minutes.

The coagulation of the elastomeric polymer being impregnated in the felt web is not uniform by its nature. Pore sizes will vary gradually from the top to the center to the bottom of the impregnated web such that very small pores are at the top and bottom, medium pores are formed between the top and bottom and the center region, and relatively large pores are formed in the center region of the web when the web is seen on edge, as illustrated in FIG. 4. The pore formation can be controlled to produce a relatively precise average pore size so that polishing abrasives used in polishing slurries can be matched to the pore size of the microporous elastomer. The matching of pore sizes 34, 36 and 38 to slurry particles 42, 44 and 46, respectively, is best illustrated in FIG. 2.

The size and shape of the micropores are controlled by the coagulation process. This is generally described in du Pont's U.S. Pat. No. 3,284,274, beginning at column 5, line 61. Basically, the impregnated felt web is subjected to coagulation during which an intercommunicating microporous structure is formed by bathing the impregnated felt web in a non-solvent (such as water, preferably, for example) which is at least partially miscible with the solvent (such as DMF, for example). The exchange of the non-solvent for the solvent precipitates the polymer to form the walls of the pores. The shape of the pores tends to be elongated with the major axes of the pores oriented normal to the surface of the web (surface 31 of FIGS. 6 and 7). As explained in U.S. Pat. No. 3,284,274, the pore size may be controlled by the relative precentages of solvent and non-solvent, and by controlling the temperature of the coagulation bath. The coagulation, and therefore the pore size, also can be controlled by using accelerators, such as water (about 1% to about 4%), fine silica, carbon black or polymers having a higher molecular weight than the basic elastomer, for example high molecular weight PVC (about 5% to about 40%). These additives cause rapid precipitation of the polymer to form smaller pores. Certain inhibitors, which slow the precipitation to form larger pores, such as methanol or ethanol (about 1% to about 10%), salts, such as NaCl or KCl, or polymers having a lower molecular weight than the basic elastomer, for example, a low molecular weight PVC, or even lower molecular weight polyurethanes.

The excess, free solvent which had dissolved the polymer and which is still remaining after the coagulation step is substantially removed by further solvent exchange techniques known to those skilled in the art. Finally, substantially all of the non-solvent from the resulting substantially solvent-free microporous polymer is removed, usually by heating in an oven or over heated drying cans for a suitable time and temperature to render the product substantially dry.

It must be noted that FIG. 2 is oriented as a 90° rotation clockwise or counterclockwise in the plane of the paper with respect to FIG. 6, and a further 90° clockwise or counterclockwise rotation into and out of the plane of the paper with respect to FIG. 6. Thus, when the pores of FIG. 2 are formed, article 10 is viewed as if it had the orientation of FIG. 4 such that the small pores 38 would be on the bottom and top (looking at the side view of FIG. 4), the largest pores 34 are toward the center, and the medium sized pores 36 are between pores 34 and 38. Moreover, because of the nature of the coagulation process, the pores are generally elongated from top to bottom generally transverse to the uni-directional fibers 16 (as formed in the side view of FIG. 4). When the poromeric articles of the present invention are finally fabricated, the pores are oriented so that their longest axis is generally parallel to work surface 12.

As also diagrammatically illustrated in FIG. 2, the micropores of the elastomer are interconnected by a matrix of microtubes 40. Only a few microtubes are illustrated for the sake of clarity, but such microtubes extend throughout the impregnated structure interconnecting each micropore to surrounding micropores. The micropore-microtube interconnected structure provides the elastomer and the resulting poromeric article with microporous, breathable characteristics.

The relative proportion of elastomer to fiber is important in determining the characteristics of the article according to the present invention. The amount of elastomer in the impregnated web is a function of the solution solids content of the polymer used to make the elastomer. Since fiber density for any given web is constant, the elastomer content is a function of only two variables: solution solids content and web density. Data relating to this ratio based on different types of fibers and elastomers have been published. The general relationship is defined by the following equation:

$$R_{E/F} = X_E D_E \left( \frac{1}{D_W} - \frac{1}{D_F} \right)$$

$R_{E/F}$ = the ratio of elastomer to fiber.
$X_E$ = the weight fraction of solids in the elastomer polymer solution.
$D_E$ = the solution density (g/cc).
$D_W$ = web density (g/cc).
$D_F$ = fiber density.

Figure 16:
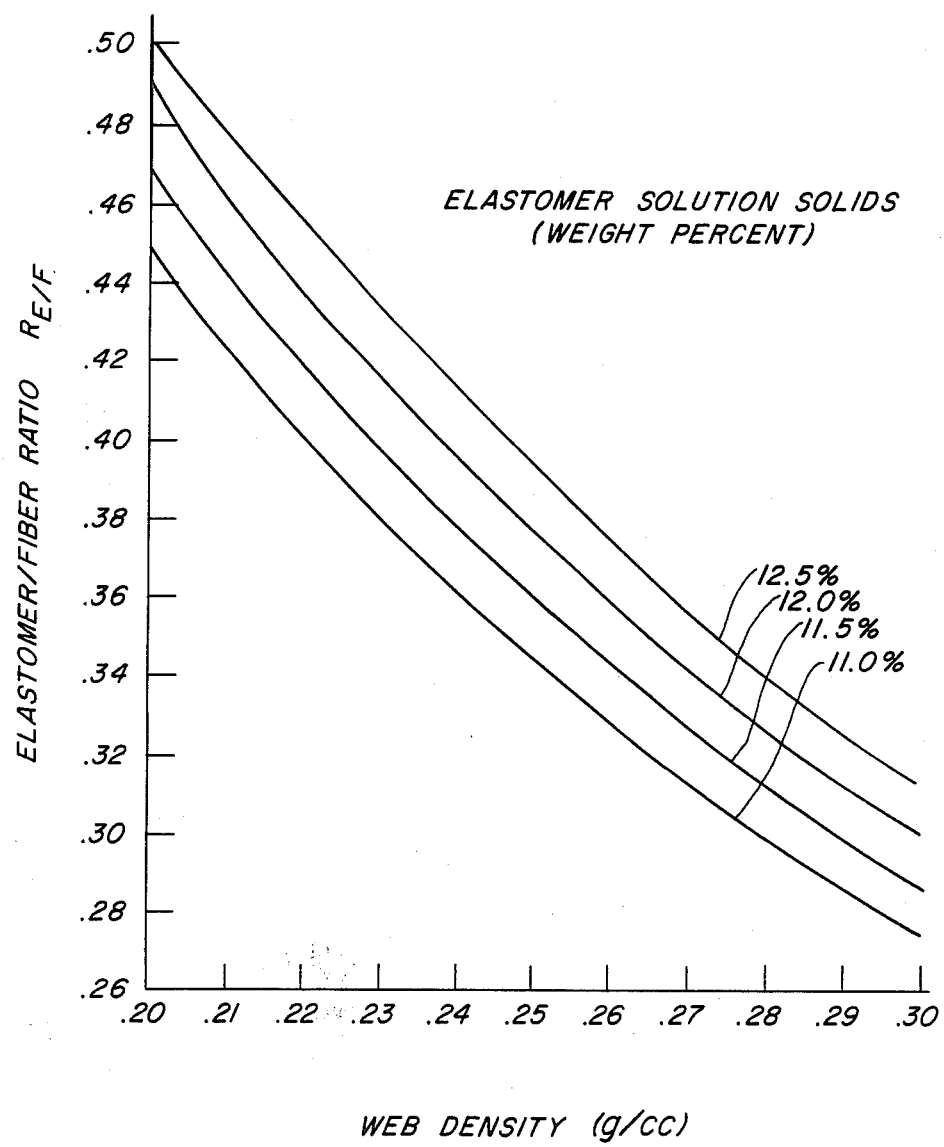
FIG. 16 is a graph setting forth examples of the elastomer/fiber ratio as a function of web density and elastomer polymer solution solids for the presently preferred compositions for making the article of the present invention.

FIG. 16 is a graph setting forth examples of curves for the elastomer/fiber ratio as a function of web density and for three selected elastomer polymer solution solids percentages for the presently preferred composition for making the article of the present invention. Other curves could be drawn based on the formula set forth above. The solution density is about $0.94 + X_E/10$ at 50° C. which relates to a polyether polyurethane polymer. The fiber density is 1.38 g/cc for the preferred polyester fibers, and the web density preferably is 0.26 g/cc. Data for other polymer and fiber systems are published and are readily available to those of ordinary skill in the art. The published data provide the basis for standard calculations so that the skilled chemist or chemical engineer can determine the relative amounts of elastomer and fiber for any given system without undue experimentation.

When the felt is impregnated with the elastomer, the presently preferred poromeric article formation technique continues, as best illustrated in FIGS. 6 and 8. Assuming that uni-directional fibers are oriented in the machine direction, the impregnated web is cut transversely to form a plurality of strips 27. The strips are then cut from the web along a line to form a cut edge 28 in the web (FIG. 6). The end edge 30 of cut strip 27 (FIG. 8) mates with the cut edge 28 of the felt web.

The most basic embodiment of poromeric article 10 of the prevent invention is formed as just described by transversely cutting the impregnated felt web and orienting it such that the transverse cut edges form work surface 12. By comparing FIG. 8 to each of FIGS. 2 and 6, it will be apparent to those skilled in the art how the poromeric material of the present invention is made. Unlike the prior art, where the work surface would be represented generally as surface 31 (although the prior art web did not have fibers with a uni-directional orientation like the present invention), surface 31 of the present invention represents a side surface, not the work surface. This results in the advantages for the present invention as set forth above. Although the drawings illustrate the alignment of uni-directional fibers 16 in the machine direction of web 14, which becomes primarily transverse to the work surface 12 when the web is cut transversely, the uni-directional fibers could be oriented in any direction in the web, so long as they are primarily transverse to the work surface of any article ultimately formed from the web.

There are no set limits for the dimensions of an article 10 of the present invention, as illustrated in FIG. 8. It can have any thickness, width and length, so long as its structural integrity is maintained. The most important dimension is probably the height "h" when the article is oriented as in FIG. 8. Depending on the type of polishing operation involved, the height may vary from a minimum height for handling the article, such as a few thousandths of an inch, to two inches (50.8 mm) or more. A presently preferred height for article 10 as illustrated in FIG. 8 is where the height h is about 1¼ inches (31.2 mm) with a width w of about 7/32 inch (5.6 mm). The length is indeterminate and can be trimmed to any desired length.

When the article of the present invention is used for polishing purposes, most of the polishing is done by the elastomer polymer, without but preferably with abrasive slurries (particles 42, 44 and 46 in FIG. 2), rather than by the fibers. Since uni-directional fibers 16 are primarily transverse and preferably perpendicular to work surface 12, a maximum surface area of elastomer is exposed. The ratio of surface area of elastomer to surface area of fiber at the work surface of the present invention is much greater than a corresponding ratio for prior art polishing pads with a random fiber orientation primarily parallel to the work surface. In the present invention, unlike the prior art, the primarily transverse fibers 15, 16, 17 and 19 have an active, beneficial polishing function. Tips 18 of fibers 16 (and similarly in the other primarily transverse fibers 15, 17 and 19) often incorporating fine abrasives and pigments are effective in polishing many materials, for example, silicon and metals.

When article 10 of the present invention is used to polish a workpiece, the orientation of the fibers and pores effect the "pumping action" discussed above. Where the polishing is actually taking place, the pumping action is most pronounced in an area closest to the workpiece to a depth of about 0.002 inch to about 0.010 inch (0.05 mm–0.25 mm). Moreover, the pumping action is enhanced by having the major axis of the elongated pores generally parallel to the work surface. This adds to the effectiveness of clearing and cleaning the pores. Because the composition of article 10 is substantially uniform throughout its thickness, the same degree of pumping exists throughout its thickness. As the pressure of the workpiece passes over a pore, the elastomer in the vicinity of the pore is compressed, the pore volume is reduced and particles of spent polishing slurry, tiny chips and particles from the workpiece being polished and other contaminants are expelled from the polishing pad made using the article of the present invention. Where relatively thick articles are formed (about 0.15 to about 0.35 inch, corresponding to about 3.8 to about 8.9 mm), the pore sizes will vary as illustrated in FIG. 2. The size of pores 34, 36 and 38 will be able to match more nearly with abrasive slurry particles 42, 44 and 46, respectively, to produce an averaging effect along the work surface.

Because of the fiber orientation primarily transverse to the work surface, and especially with the preferred uni-directional fiber orientation, spent slurry, dross or particles from the polished workpiece generally do not become entrapped in the article. This is due to the presence of relatively few fibers parallel to the work surface which can create loops in which the particles can become embedded. Moreover, the work surface is constantly renewed by the polishing process and, if desired, the work surface can be scraped or otherwise abraded to completely recondition it, repeatedly if necessary, until the article is so thin that it cannot be handled. Because of the unique characteristics of the present invention, polishing pads formed from articles of the present invention can polish on the order 2½ times faster and last on the order of at least 12 times as long.

While the basic article of manufacture 10 according to the present invention may have a width (w, in FIG. 8) corresponding to the width of a single piece of the impregnated felt web, it is presently preferred to laminate together a plurality of articles 10 such that the work surfaces of the laminated articles are substantially coplanar. This construction is best illustrated in FIG. 1 where laminated article 50 comprises articles 10, 10' and 10" laminated together along their side edges 31, 31' and 31", respectively, by a bonding agent 52.

Bonding agent 52 must be an elastomeric adhesive compatible with the porous elastomer 32 which impregnates the felt. Preferably, bonding agent 52 is identical to microporous elastomer 32 to assure total compatibility. Moreover, where identical polymers are used as impregnating agent 32 and bonding agent 52, the bond is molecular in nature and does not represent a true discontinuity.

The nature of the surfaces 31, 31' and 31" to be bonded should be controlled so that they have neither too much elastomer nor too much fiber exposed. This is done by scraping more than a slight of excess of the bonding agent or elastomer off of the surfaces with doctor blades, bars or other tools having well defined edges, or by subjecting the bonding agent on the sides to a nip roller or metering roller processing. Optimum bonding strength is achieved when the bonding agent penetrates and re-dissolves into the side surfaces of article 10 to the proper amount. This condition is controlled by the nature of the bonding agent, its viscosity, the laminating pressure, and the type of drying or curing technique. Although conventional convection oven drying may be used, where a polar solvent, such as DMF is used in the preferred urethane-polyester fiber article, microwave heating techniques are particularly effective to produce a high quality bond.

An effective bond is created when the same presently preferred polyether polyurethane polymer is used both as the porous elastomer and as the bonding agent. The polyurethane bonding agent should have a viscosity of about 2,000 to about 10,000 cps. The bonding agent should penetrate the side edges about 0.010 to about 0.030 inch (about 0.025 to about 0.76 mm), when a pressure of about 20 to about 50 psi is applied to the laminate.

A thin film of bonding agent 52 between articles 10, 10' and 10" is desirable, on the order of about 0.002 to about 0.005 inch (about 0.05 to about 0.13 mm). The thickness of the bonding agent layers is controlled so that they wear at the same rate as the other components of the laminated article. Each layer of bonding agent 52 has an end portion 54 adjacent to or extending slightly from work surface 12. Ends 54 perform an active polishing function as do ends 18 of uni-directional fibers 16. Moreover, ends 54, being of a softer material than fiber tips 18, perform a type of wiping function of cleaning and clearing the surface of the workpiece during the polishing operation.

To make a typical laminated article 50 according to the present invention, several of the basic articles 10 are laminated together and then the laminate is cut or machined to have any desired configuration, so long as work surface 12 is used as the polishing surface, the support surface and the like.

As illustrated in FIG. 3, article 10 (or laminated article 50, not illustrated) may be adhesively attached to a support structure, such as support 23 for a polishing tool. Surface 13 opposite work surface 12 is bonded by adhesive 21 to the surface of support 23. Fiber ends 20 which may extend slightly from surface 13 aid in the bonding of article 10 or laminate 50 to support 23. Typical exemplary supports are illustrated in my above-identified patents and need not be described in detail herein.

FIG. 9 illustrates top views of several embodiments of polishing discs formed with laminates 50 of the present invention. In each of FIGS. 9A–9F, numeral 10 designates articles of the present invention formed into strips, while numeral 52 designates the bonding agent for bonding together the strips of articles 10.

Figure 9A:
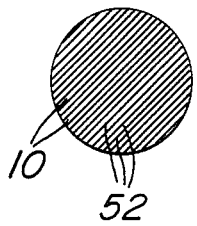
FIGS. 9A-F are plan views of various embodiments of disc shaped polishing pads using laminated articles according to the present invention.
Figure 9B:
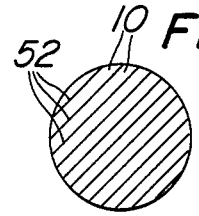
Figure 9C:
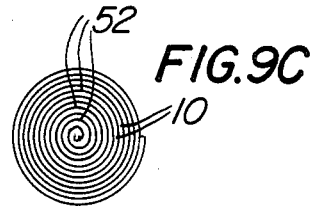
Figure 9D:
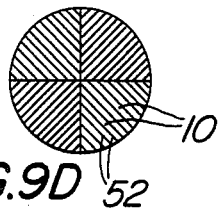
Figures 9E, 9F:
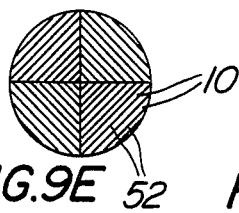

FIG. 9A illustrates a configuration comprising a high density of narrow laminations arranged parallel to each other. FIG. 9B illustrates a configuration comprising a less dense lamination in which the strips are parallel to each other. FIG. 9C illustrates a configuration in which the strips are formed into a laminated spiral arrangement. FIG. 9D illustrates a configuration in which several parallel laminations are arranged in a radially segmented pattern. FIG. 9E illustrates a configuration in which several parallel configurations are segmented generally parallel to the direction of rotation. FIG. 9F illustrates a configuration in which parallel laminations are segmented but are separated by channels 56 and 58.

Obviously, any combination of these arrangements, or any or other arrangement of laminations may be used so long as the preferably uni-directional fibers are oriented primarily transverse to the work surface of articles 10 and of laminated articles 50. The work surface of articles 10 or laminates 50 may be textured, grooved, segmented, embossed, perforated, skived, separated or otherwise treated to facilitate efficient slurry flow and distribution.

FIGS. 10 through 12 diagrammatically illustrate the formation of laminates according to the present invention in which the uni-directional fibers are oriented at various transverse angles with respect to the work surface. These Figures also schematically illustrate the relative polishing action of the different embodiments on a workpiece as the laminates are moved to the right and to the left with respect to the workpiece.

In FIG. 10, uni-directional fibers diagrammatically indicated by numeral 16 of laminate 60 are oriented substantially perpendicular to work surface 12. In this orientation, equal polishing action is imparted to a workpiece whether the laminate is moved to the right as indicated by arrow 62 or to the left as indicated by arrow 64.

As the uni-directional fibers form decreasing angles with respect to the work surface, the nature of the work surface changes. Progressively, less elastomer and more fiber is exposed. The exposed ends of the fibers (greatly elongated for the sake of clarity) begin to lean with the angle of orientation. This introduces polishing directionality. Depending on the fiber angle, fiber density, and degree of bond, the polishing and scrubbing action varies.

In FIG. 11, uni-directional fibers 16 of laminate 66 are oriented at an angle of about 60° with respect to work surface 12. Angled orientations of the uni-directional fibers are achieved by laying the cut strips 27 (FIG. 6) at the desired angle in a press and cutting off the excess or protruding corners to produce the angled work surface 12, rather than perpendicularly across the impregnated felt web 14 having uni-directional fibers 16 oriented as illustrated therein. Referring again to FIG. 11, the polishing action will be firmer as indicated by arrow 68 when laminate 66 moves to the right with respect to a workpiece. Conversely, when laminate 66 is moved to the left as indicated by arrow 69, the polishing action will be softer not only than the polishing action indicated by arrow 68 but also softer than the polishing action where the fibers are oriented substantially perpendicular to work surface 12.

In FIG. 12, uni-directional fibers 16 of laminate 70 are oriented at an angle of about 45° with respect to work surface 12. In this embodiment, when laminate 70 is moved to the right with respect to a workpiece as indicated by arrow 72, the scrubbing action is relatively harsh. Conversely, when laminate 70 moves to the left with respect to a workpiece as indicated by arrow 74, there is a very gentle wiping action.

From the description of FIGS. 10 through 12, it should be apparent to those skilled in the art that the degree of polishing action can be adjusted not only by selecting the proper elastomer and fiber components for a poromeric polishing pad according to the present invention, but also by varying the primarily transverse angle of orientation of the uni-directional fibers with respect to the work surface. Angles less than about 45° should not be used as the fibers may tend to entrap removed workpiece particles, spent slurry and other impurities.

FIGS. 13 and 14 illustrate benefits of using the present invention (FIG. 14) compared to prior art poromeric pads (FIG. 13) when the polishing pads are attached to a roller. Poromeric pads or covers are attached to rollers when they are used in polishing, printing, as hickey pickers, etc.

In FIG. 13, a conventional poromeric pad 76 containing fibers 82 generally parallel to work surface 83 is attached to a curved surface, such as that of roller 78 by adhesive 80. Because of the general parallel orientation of the majority of fibers forming the cover, fibers 84 closest to the surface of roller 78 are placed under compression and fibers 86 farthest from the surface of the roller and closest to work surface 83 are under tension. As the roller rotates against a work surface, fibers 88 adjacent to work surface 83 are pulled out or flayed from the surface, entrapping impurities and impeding the polishing of the workpiece or other operation. Moreover, because of the compression and tension of fibers 84 and 86, there is a tendency for the ends 90 and 92 of cover 76 to lift off of and become separated from roller 78.

The disadvantages of the prior art as illustrated in FIG. 13 are overcome by using a poromeric pad or cover according to the present invention. As illustrated in FIG. 14, a cover 94 comprising a laminate according to the present invention is bonded to roller 96 by adhesive 98. Fibers 100 are oriented to be primarily transverse to and preferably uni-directional substantially perpendicular to work surface 102. Fiber tips 104 extend slightly beyond work surface 102 (but which are shown greatly extended for the sake of clarity) aid in the polishing action or other operation as described above, rather than hinder the polishing action as in the prior art. Because the majority, and preferably the vast majority, of fibers of the present invention are oriented primarily transverse to the work surface, areas of greater tension and areas of greater compression generally cannot exist. This is especially true for the preferred uni-directional fiber orientation substantially radially extending from the curved work surface. Accordingly, there are hardly any internal forces to cause the cover to separate from the roller.

The present invention may be embodied in other specific forms without departing from the spirit or the central attributes thereof and, accordingly, reference should be made to the appended claims, rather than to the foregoing specification as indicating the scope of the invention.

I claim:

1. A poromeric article of manufacture comprising a felt sheet of fibers impregnated with microporous elastomer having a work surface, side surfaces joining the work surface and a support surface joining the side surfaces, wherein a majority of the fibers are oriented primarily transverse to the work surface such that the majority of fiber ends adjacent to the work surface form an angle of between about 45° and about 135° with respect to the work surface.

2. A poromeric article according to claim 1 wherein the fibers are uni-directional and substantially perpendicular to the work surface.

3. A poromeric article according to claim 1 wherein the elastomer is comprised of urethane and the fibers are comprised of polyester.

4. A poromeric article according to claim 2 wherein the elastomer is comprised of urethane and the fibers are comprised of polyester.

5. A poromeric article according to claim 1 in which there is a substantially uniform distribution throughout the thickness of the article of the fibers oriented primarily transverse to the work surface.

6. A laminated article of manufacture comprising a plurality of articles according to claim 1 bonded together and oriented such that the work surfaces of adjacent articles are substantially coplanar.

7. A laminated article of manufacture according to claim 6 in which the fibers are uni-directional and substantially perpendicular to the work surfaces.

8. A laminated article of manufacture according to claim 6 wherein the elastomer is comprised of urethane and the fibers are comprised of polyester.

9. A laminated article according to claim 7 wherein the elastomer is comprised of urethane and the fibers are comprised of polyester.

10. A laminated article according to claim 8 wherein the articles are bonded together by a bonding agent selected from urethane identical to the urethane of the article and an elastomeric adhesive compatible with the urethane of the article.

11. A laminated article according to claim 8 wherein the articles are bonded together by the same urethane as the urethane of the article.

12. An article according to claim 11 wherein the elastomer, fibers and bonding agent wear at substantially the same rate.

13. An article according to claim 1 wherein the elastomer and fibers wear at substantially the same rate.

14. An article according to claim 4 further comprising abrasive particles incorporated within the fibers.

15. An article according to claim 14 wherein the abrasive is titanium dioxide.

16. A process of making an article of manufacture comprising the steps:
 (a) making a preform by
  (i) forming a felt sheet made of fibers in which the majority of fibers are arranged to provide a predetermined orientation,
  (ii) impregnating the felt sheet with a microporous elastomer, and
  (iii) curing the elastomeric impregnated felt sheet; and
 (b) cutting the preform in such a manner that the majority of fibers are oriented primarily transverse to the cut surface, the cut surface forming a work surface whereby the predetermined orientation is such that the majority of fiber ends adjacent to the work surface form angles of between about 45° and about 135° with respect to the work surface.

17. A process according to claim 16 wherein the fibers are uni-directional and substantially perpendicular to the work surface.

18. A process according to claim 16 further comprising the step of again cutting the article in a direction primarily transverse to the work surface.

19. A process according to claim 18 wherein the fibers are uni-directional and substantially perpendicular to the work surface.

20. A process according to claim 18 further comprising forming a laminated article of manufacture by bonding together a plurality of cut articles such that the work surfaces of adjacent articles are substantially coplanar.

21. A process according to claim 20 wherein the fibers are uni-directional and substantially perpendicular to the work surface.

22. A process according to claim 21 further comprising attaching the laminated article to a support whereby the work surface of the article is opposite to the surface of the support to which the article is attached.

23. A process according to claim 22 wherein the laminated article is adhesively bonded to the support.

24. A process according to claim 23 wherein the support has a curved mounting surface.

25. A process according to claim 23 wherein the support has a planar mounting surface.

* * * * *